Figure 1:
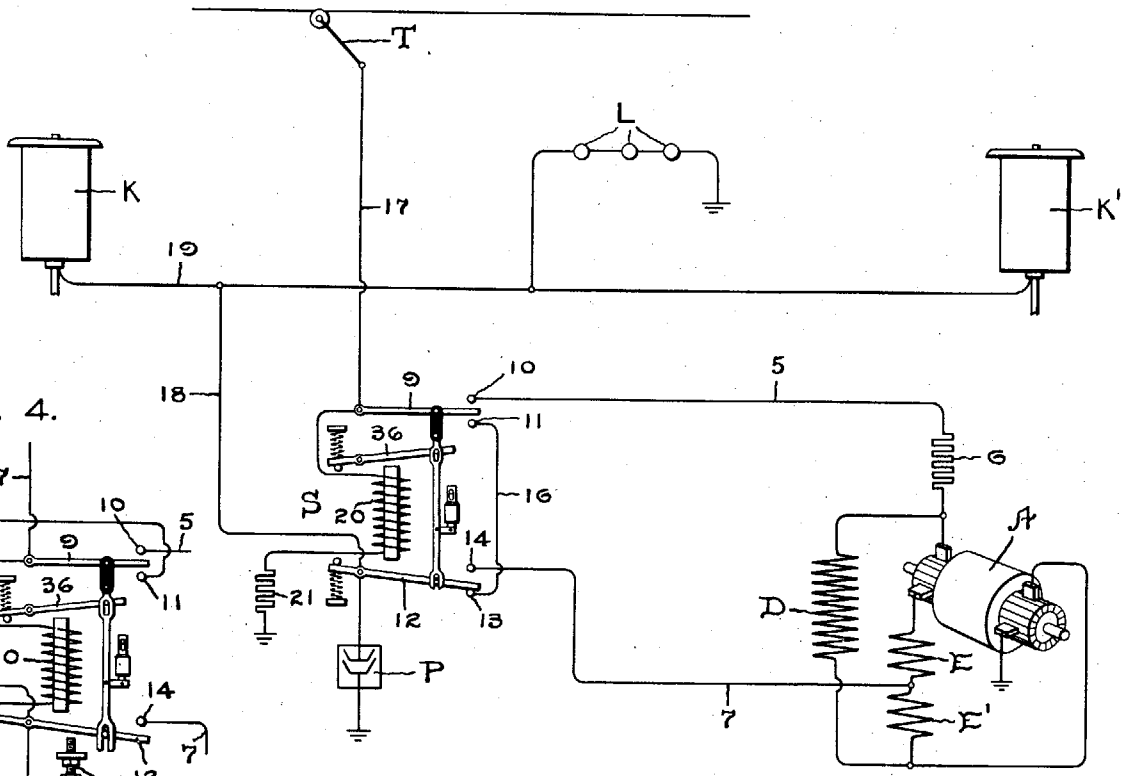

Reissued June 10, 1913.

E. R. CARICHOFF.
SELECTIVE SYSTEM.

13,572.

APPLICATION FILED MAY 3, 1913.

2 SHEETS—SHEET 1.

WITNESSES:
Lester W. Fuhrmann.
Marcus L. Byng.

INVENTOR
EUGENE R. CARICHOFF.
BY Albert G. Davis
ATT'Y.

COLUMBIA PLANOGRAPH CO., WASHINGTON, D. C.

Reissued June 10, 1913.

E. R. CARICHOFF.

SELECTIVE SYSTEM.

13,572.

APPLICATION FILED MAY 3, 1913.

2 SHEETS—SHEET 2.

WITNESSES:

Luther H. Fulmer.

Marcena L. Byng.

INVENTOR

EUGENE R. CARICHOFF.

BY Albert G. Davis

ATT'Y.

COLUMBIA PLANOGRAPH CO., WASHINGTON, D. C.

UNITED STATES PATENT OFFICE.

EUGENE R. CARICHOFF, OF SCHENECTADY, NEW YORK, ASSIGNOR TO GENERAL ELECTRIC COMPANY, A CORPORATION OF NEW YORK.

SELECTIVE SYSTEM.

13,572. Specification of Reissued Letters Patent. Reissued June 10, 1913.

Original No. 1,057,035, dated March 25, 1913, Serial No. 515,138. Application for reissue filed May 3, 1913. Serial No. 765,722.

*To all whom it may concern:*

Be it known that I, EUGENE R. CARICHOFF, a citizen of the United States, residing at Schenectady, in the county of Schenectady and State of New York, have invented certain new and useful Improvements in Selective Systems, of which the following is a specification My invention relates to selective systems or switches and is particularly intended for use in connection with electrically driven cars designed for operation on railroads on which current is furnished on different sections of the line at different potentials, for example 1200 and 600 volts. In such railway systems it is the custom to provide each car with a small motor generator or dynamotor which, when the car is upon a 1200 volt section of line, serves to reduce the high voltage of the line to a lower voltage, say 600 volts, for the purpose of supplying current to the control and lighting circuits of the car. When the car is operating upon a 600 volt section of line the control and lighting circuits are connected directly to the current collecting device and receive the voltage of the source. In equipments of this kind, it is desirable that means be provided for automatically connecting the control and lighting circuits of the car to the trolley or to the dynamotor, according as the car is on a low or high potential section of line. Under some conditions also it is desirable that the dynamotor be automatically started and stopped, according as the car is upon a high or low potential section of line.

My invention has for its object to provide a safe, simple, and efficient arrangement whereby the auxiliary circuits of the car will be automatically connected either directly to the trolley or to the dynamotor according as the car is upon a low or a high potential section of line; and whereby, at the same time, if desired, the automatic starting and stopping of the dynamotor according as the car is upon a high or low potential section will be provided for. It will be understood that my invention is not limited to use in this particular connection but may be utilized for any other purpose where it is desired to vary certain electrical connections in response to change of conditions in some circuit.

In order that my invention may be easily understood I will now proceed to describe one construction and arrangement in which it may be embodied having reference to the accompanying drawings, in which—

Figure 4:
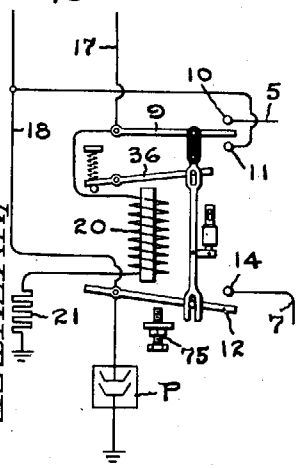
Figure 3:
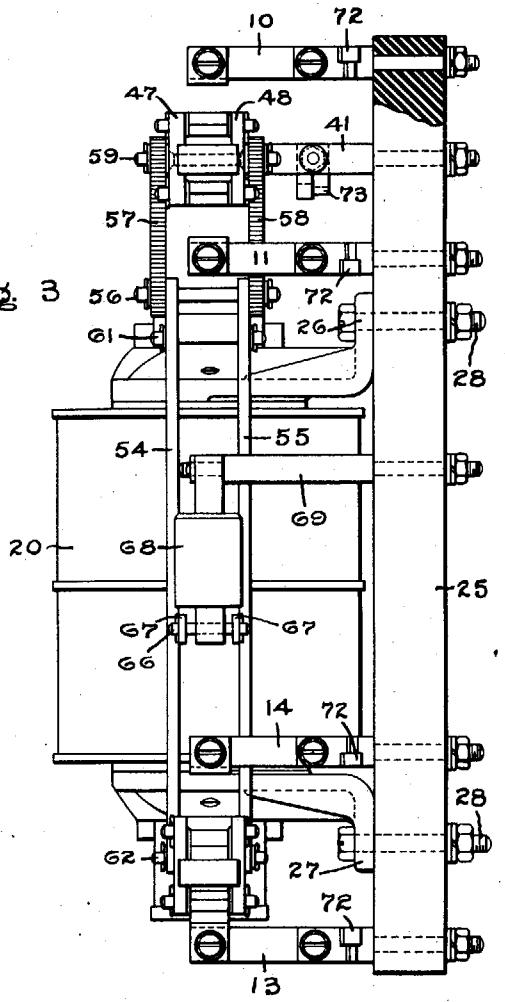
Figure 2:
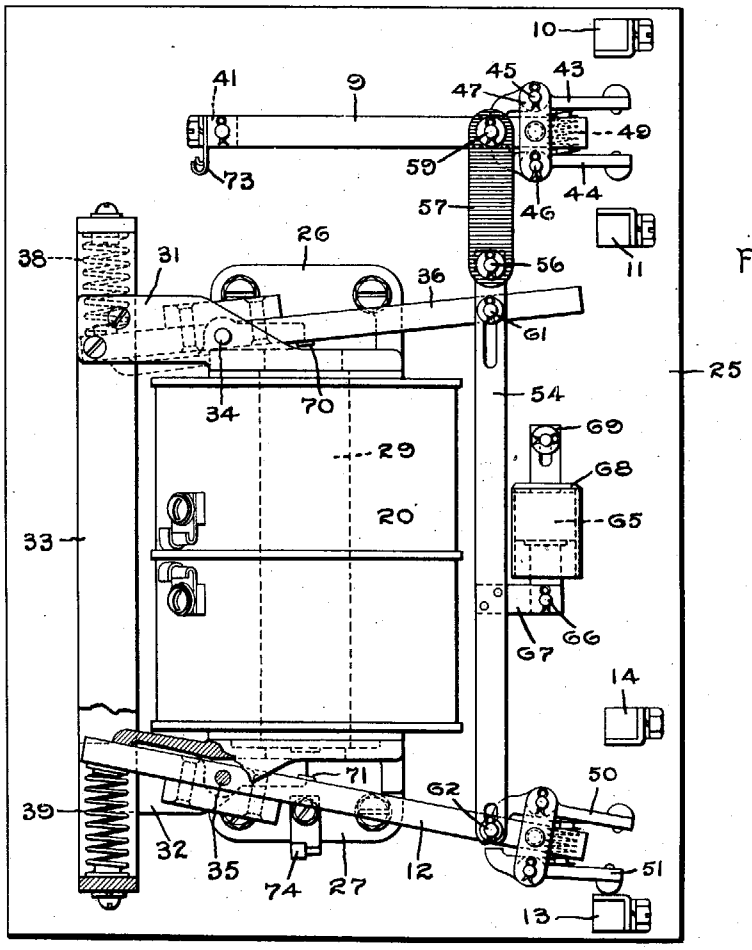

Figure 1 is a diagram of certain circuits of a car intended for operation upon a line having sections supplied with current at different potentials, my selective device being shown diagrammatically; Figs. 2 and 3 are front and side elevations, respectively, of the selective device shown in Fig. 1; and Fig. 4 is a diagram showing a modification.

Referring to Fig 1, the current collecting device or trolley T is shown as engaging with a trolley wire which we will assume is at some sections of the line energized with one potential and at other sections at another potential, say, for example, 600 and 1200 volts. The master-controllers, by which the electrically operated control apparatus of the car is controlled, are indicated at K and K′. The dynamotor which, during operation of the car upon a high potential section of line, furnishes current to the control circuits and lights, and any other auxiliary apparatus on the car, is shown as of the type covered by a patent issued in the name of Max R. Hanna, No. 897,257, dated August 25, 1908. This dynamotor has an armature A and field coils D, E and E′ constructed and arranged as set forth in the above-named patent. The current for the motor side of the dynamotor is furnished through a wire 5 and a resistance 6, permanently connected in circuit in order to protect the dynamotor in starting, and the current furnished by the dynamotor is taken off through the wire 7, the other terminal of the machine being grounded. The selective device S is shown diagrammatically and will be hereinafter fully described in connection with Figs. 2 and 3. The selective device is provided with a movable switch member 9 which coöperates with fixed contacts 10 and 11, and with a movable member 12 which coöperates with fixed contacts 13 and 14. The wires 5 and 7 respectively are connected to the fixed contacts 10 and 14, and the fixed contacts 11 and 13 are electrically connected by a wire 16. The lever 9 is electrically connected by a wire 17 to the trolley T, and the lever 12 is connected by a wire 18 to the wire 19 leading to the control circuits of the car and to the lights L. A lightning arrester P may be connected between the wire 18 to ground in order to protect the circuits. The actuating coil 20 of the selective device is permanently connected between the trolley T and ground through the wire 17 and a resistance 21 as shown.

The electrical connections having been described, I will now turn to Figs. 2 and 3, in which the mechanical construction of the selective device is illustrated. The various parts of the device are shown as mounted upon a base 25 of insulating material. The actuating magnet 20 is supported between brackets 26 and 27 bolted to the base 25 by bolts 28. These brackets 26 and 27 are connected by an iron core 29 which passes through the coil 20. Extending laterally from the brackets 26 and 27 are pairs of lugs 31 and 32 to which is secured a rectangular frame 33 and between these pairs of lugs 31 and 32 at 34 and 35 are pivoted the levers 36 and 12 which serve as armatures coöperating with the magnet 20. The lever 36 is biased to the position shown by a spring 38 arranged between the end of the lever and the top of the rectangular frame 33 and the lever 12 is biased to the position shown by the spring 39 arranged between the lower end of the rectangular frame 33 and the end of said lever. The lever 9 is pivotally arranged on a stud 41 bolted to the backboard 25. The fixed contacts 10, 11, 13 and 14 are also bolted to the base 25 as shown. The outer end of the lever 9 is provided with contact fingers 43 and 44 pivoted at 45 and 46 in plates 47 and 48 secured vertically to the sides of the lever 9. These contact fingers 43 and 44 are biased apart by a spring 49 arranged between them and passing through a hole in the outer end of the lever 9 as shown; the rear ends of the fingers 43 and 44 being arranged to engage with the lever 9 and thereby limit the rotation of said fingers under the influence of the spring 49. The end of the lever 12 is provided with contact fingers 50 and 51 which are similar to contact fingers 43 and 44 on the end of the lever 9 and coöperate with the fixed contacts 13 and 14 as do the fingers 43 and 44 with the fixed contacts 10 and 11. When the selective device is in its inoperative position, as shown, the lever 9 is held with the contact fingers 43 and 44 out of engagement with the fixed contacts 10 and 11 by a connection between this lever and the armature lever 36. This connection comprises the frame composed of the bars 54 and 55 pivotally connected at 56 to the links 57 and 58 of insulating material pivotally connected to the lever 9 at 59. The bars 54 and 55 are connected to the armature lever 36 and to the lever 12 by pins 61 and 62 which pass through said levers and coöperate with slots in the bars 54 and 55, as clearly shown in the drawing. The length of the slots in which the pin 61 moves is such that when the armature lever 36 is in its deënergized position, as shown, the lever 9 will be held in its mid position, as shown, and when the armature 36 is attracted by the magnet 20 the lever 9 is free to drop until the contact finger 44 makes contact with the fixed contact 11. When the lever 9 is in its lower position the rods 54 and 55 have fallen so that the upper end of the slot coöperating with the pin 62 in the lever 12 is nearly in engagement with said pin. With this arrangement it will be apparent that when the lever 12 is attracted by the magnet 20 and has moved to its upper position, in which the contact finger 50 engages with the fixed contact 14, it will, through the medium of the rods 54 and 55 and links 57 and 58, raise the lever 9 to its upper position in which the finger 43 engages with the contact 10, this movement being permitted while the armature lever 36 is in its lower position by the pin and slot connection between the lever 36 and rods 54 and 55. The dash-pot, with which the selective device is provided, comprises a piston member 65 pivotally secured at 66 to lugs 67 extending outwardly from the rods 54 and 55, and a cylinder member 68 supported by a pin and slot connection from a bar 69 bolted to the backboard 25. The length of the slot in the lug extending from the cylinder of the dash-pot must be such that the movement of the bars 54 and 55 to their extreme upper position will not be interfered with. The dash-pot is provided with a valve of well-known form which retards the admission of air into the cylinder above the piston but allows air to escape freely therefrom. The dash-pot, therefore, serves to delay the falling of the bars 54 and 55 and consequent falling of the lever 9 to bring the finger 44 into engagement with the contact 11, when the armature lever 36 is attracted by the magnet 20; the dash-pot should have no retarding effect in the other direction. The air gap between the core 29 of the magnet 20 and the lever 36 should be smaller than the air gap between said core and the lever 12, in order that the lever 36 may be attracted at a smaller current value in the magnet 20 than that required to attract the lever 12. The variation can be easily regulated by adjustment of the tension of the springs 38 and 39, as for example, by interposing washers between the ends of said springs and the ends of the frame 33, or in any other suitable manner. The lugs 70 and 71 projecting from the inside of the levers 36 and 12 may be of some non-magnetic material and serve in a well-known way to prevent sticking of the levers 36 and 12 to the ends of the core 29 of the electromagnet 20. Electrical connection is made with the fixed contacts 10, 11, 13 and 14 in any suitable manner, as by means of clips 72 as shown. The links 57 and 58 and the backboard 25 being of insulating material, the lever 9 is insulated from the lever 12 and connection is made with the former by means of the clip 73 secured to the bar 41 and to the latter by means of a clip 74 secured to the bracket 27 in which the lever 12 is pivoted.

The operation of my selective system is as follows, it being understood that the parts as shown are in the position which they assume when there is no voltage at the trolley, or at least voltage of a very low value insufficient to operate the selective device. If the car runs on to one of the regular low potential sections of line, say a 600 volt section, the armature 36 is attracted by the magnet 20 and the lever 9 is allowed to drop under the retarding effect of the dash-pot until electrical contact is made between the finger 44 of said lever and the fixed contact 11. When this occurs current is free to pass from the trolley to wire 17, lever 9 and contact finger 44, contact 11, wire 16, contact 13, finger 51 and lever 12, and wires 18 and 19 to the control circuits and the lights. The dynamotor not being connected to the trolley will not operate. If, now, the operator runs his car onto a dead section of line, for example, such as is interposed between a high and a low potential section, the selective switch will return to the position shown, and when the car actually gets on to the high potential section the magnet 20 will be energized at the higher current value and both armatures 36 and 12 will be attracted by it. The dash-pot effectively prevents the lever 9 from falling and closing contact between the finger 44 and the contact 11 should it happen that the armature 36 is attracted by the magnet 20 sooner than the armature lever 12. Movement of the lever 12 to its upper position, not only brings the finger 50 into engagement with the fixed contact 14, as hereinbefore explained, but also raises the lever 9 until the finger 43 engages with the contact 10. Under this condition the dynamotor is connected to the trolley T through the wire 17, lever 9 and contact finger 43, contact 10, wire 5 and resistance 6; and the lights and control circuits of the car are connected through wires 19, 18, lever 12 and finger 50, contact 14 and wire 7 to the low potential connection of the dynamotor.

It will be evident from the diagram that the contact 11 may, if desired, be connected directly to the wire 18 instead of to the contact 13. Such an arrangement is shown in Fig. 4, the contact 13 and the wire 16 being omitted. The spring 39 and the limiting stop above that end of the lever 12 are also omitted, and an adjusting screw 75 is placed under the lever 12, so that the proximity of said lever to the core of the actuating coil 20 may be regulated in accordance with the voltage of the line. This arrangement is simpler than the one shown in Fig. 1, and for some reasons is preferable, although under some conditions it may be better to use the layout shown in Fig. 1, since with this arrangement under extreme conditions when the car runs so quickly from a low potential to a high potential section of line that the selective device does not have time to return to its deënergized position, the circuit through the contact will be broken both at the contact 11 and at the contact 13. It is to be noted that, with the construction shown, the leakage of the magnetic field from the magnet 20 will act to blow out any arcs which may be drawn between the contact fingers 43, 44, 50 and 51 and the contacts 10, 11, 13 and 14.

It is not my intention in the following claims to limit myself to the particular construction and arrangement of parts herein shown, but to cover all modifications which come within the scope thereof.

What I claim as new and desire to secure by Letters Patent of the United States, is:

1. In an electrically driven car intended for operation on sections of line furnishing current at different potentials, means carried by the car for reducing the potential of the current furnished certain car circuits when the car is operating on a high potential section of line, and electro-magnetically operated means having a single actuating coil connected to the source for automatically connecting said circuits either directly to the source or to the potential reducing means and for disconnecting the potential reducing means from the source and connecting it thereto according as the car is on a low or high potential section of line.

2. In an electrically driven car intended for operation on sections of line furnishing current at different potentials, a dynamotor carried by the car for reducing the potential of the current furnished certain car circuits when the car is operating on a high potential section of line, a selective switch device having a single actuating coil connected to the source for automatically connecting said circuits either directly to the source or to said dynamotor and for disconnecting said dynamotor from the source or connecting it thereto according as the car is on the low or high potential section of line.

3. In an electrically driven car intended for operation on sections of line furnishing current at different potentials, a dynamotor carried by the car for reducing the potential of the current furnished certain car circuits when the car is operating on a high potential section, a selective switch device for connecting said circuits either directly to the source or to the dynamotor and for disconnecting said dynamotor from the source or connecting it thereto according as the car is on a low or high potential section of line, and an electromagnet having a single coil permanently connected to the source for automatically operating said switch device according to the potential of the section of line upon which the car is located.

4. In combination, a source supplying current at different potentials, an auxiliary source deriving its generating power from the main source and supplying current at substantially constant potential, a circuit to be supplied with current, and an electromagnetically operated device having a single coil connected to the source of varying potential for connecting said circuit to the source of varying potential while that potential is below a certain value and for connecting said circuit to the source of constant potential when the potential at the other source exceeds said certain value.

5. In combination, a source supplying current at different potentials, an auxiliary source deriving its generating power from the main source and supplying current at substantially constant potential, a circuit to be supplied with current, switch devices for connecting said circuit to one or the other of said sources, and a single electromagnet connected to the source of varying potential for operating said switch devices to connect said circuit to the source of varying potential when the potential thereat is below a certain value and to connect said circuit to the source of constant potential when the potential at the other source exceeds said certain value.

6. In combination, a source supplying current at different potentials, an auxiliary source deriving its generating power from the main source and supplying current at substantially constant potential, a circuit to be supplied with current, a normally open switch for connecting said circuit to the source of varying potential, a normally open switch for connecting said circuit to the source of constant potential, and an electromagnet energized proportionally to the potential at the source of varying potential and arranged to operate said switches so that the first switch will close when the voltage at the variable potential source is below a certain value and the second switch will close when the potential at the variable potential source exceeds said certain value, and means for rendering said first switch slow in closing.

7. In an electrically driven car intended for operation on sections of line furnishing current for different potentials, means carried by the car for reducing the potential of the current furnished certain car circuits when the car is operating on a high potential section of line, an electromagnetic selective switch having a single actuating coil connected to the source of current, said electromagnet having an armature arranged to be attracted thereby at all operating currents in said magnet, a second armature arranged to be attracted by said magnet only when the current therein exceeds a certain value, switches controlled by the movement of said armatures, and connections whereby when one of said armatures is attracted the car circuits will be connected directly with the source of current and when the other armature is attracted said circuits will be connected with the said source through the said potential reducing means.

8. In an electrically driven car intended for operation on sections of line furnishing current at different potentials, means carried by the car for reducing the potential of the current furnished certain circuits when the car is operating on a high potential section of line, an electromagnetic switch having a single actuating coil connected with the source of current, said coil having an armature arranged to be attracted thereby at all operating currents in said magnet, a switch controlled by said armature normally biased to a mid-position between two operative positions, a second armature arranged to be attracted by said coil only when the current therein exceeds a certain value, and connections whereby when said first armature is attracted the said circuits will be connected directly with the source of current and when the second armature is attracted the car circuits will be connected with the said source through said potential reducing means.

In witness whereof, I have hereunto set my hand this 28th day of August, 1909.

EUGENE R. CARICHOFF.

Witnesses:
BENJAMIN B. HULL,
MARGARET E. WOOLLEY.

Copies of this patent may be obtained for five cents each, by addressing the "Commissioner of Patents, Washington, D. C."